(No Model.)

R. TEMPERTON.
HARVESTER.

No. 261,787.

3 Sheets—Sheet 1.

Patented July 25, 1882.

Witnesses:
J. W. Garner
W. H. Kerr

Inventor:
R. Temperton
per
F. A. Lehmann,
Atty.

N. PETERS. Photo-Lithographer, Washington, D. C.

(No Model.)

R. TEMPERTON.
HARVESTER.

No. 261,787.

3 Sheets—Sheet 2.

Patented July 25, 1882.

Witnesses:
J. B. Garner
W. H. Kerr

Inventor:
R. Temperton
per
F. A. Lehmann,
atty (No Model.)  R. TEMPERTON.  3 Sheets—Sheet 3.
HARVESTER.
No. 261,787.  Patented July 25, 1882.
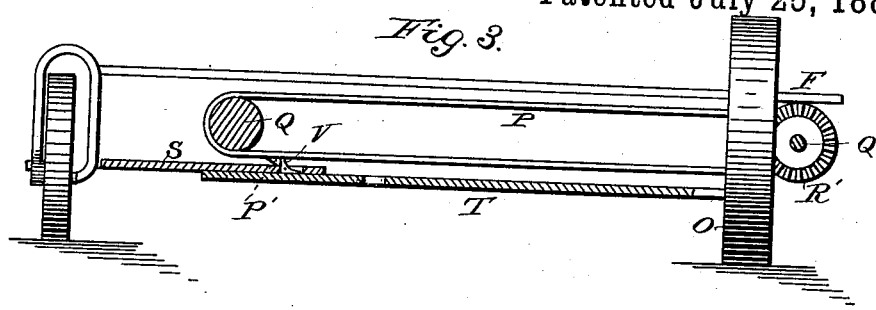
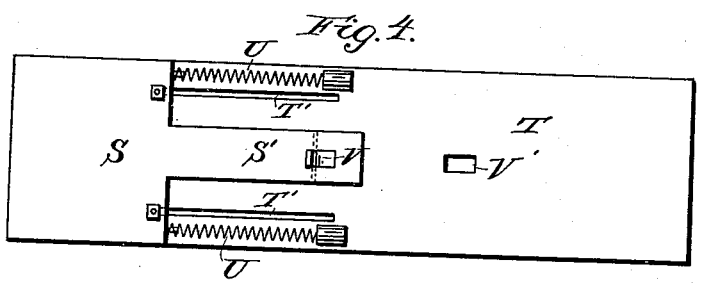
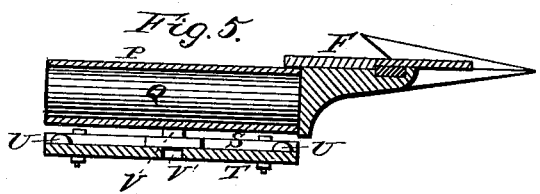
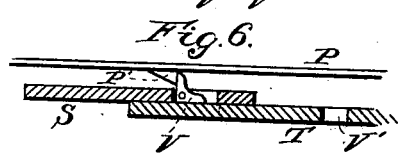
Witnesses:
J. W. Garner
W. H. Kern
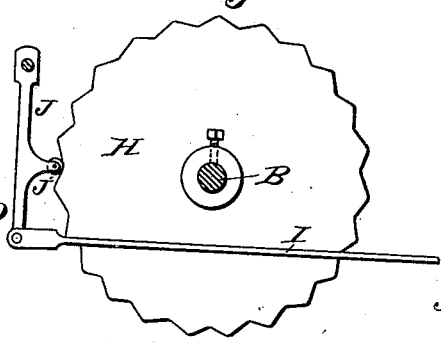
Inventor:
R. Temperton,
per
F. A. Lehmann,
Atty.

UNITED STATES PATENT OFFICE.

RICHARD TEMPERTON, OF HINE'S CORNERS, PENNSYLVANIA.

HARVESTER.

SPECIFICATION forming part of Letters Patent No. 261,787, dated July 25, 1882.

Application filed May 24, 1882. (No model.)

*To all whom it may concern:*

Be it known that I, RICHARD TEMPERTON, of Hine's Corners, in the county of Wayne and State of Pennsylvania, have invented certain new and useful Improvements in Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in harvesters; and it consists, first, in the combination of the cutter-bar secured at its center to the front end of the tongue, the tongue having its rear end secured to the draft-frame, which has bearings for the driving-shaft and a rearward extension for supporting the driver's seat, and an elevating mechanism; second, in suitable mechanism whereby the motion of the drive-wheel is imparted to the cutter-bar; and, third, in suitable mechanism whereby the front end of the tongue bearing the mowing mechanism may be raised from the ground when the machine is not in operation.

Figure 1:
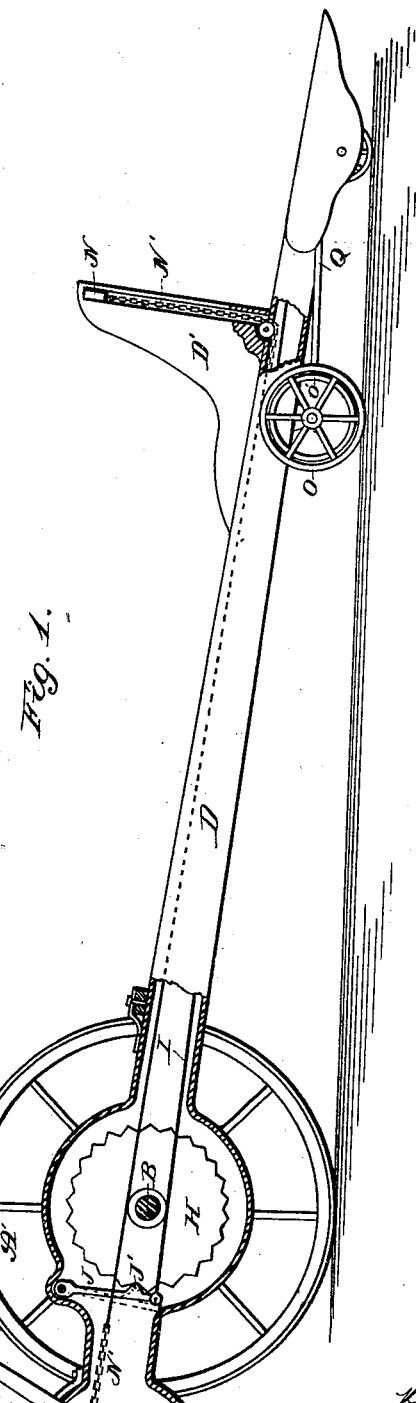
Figure 2:
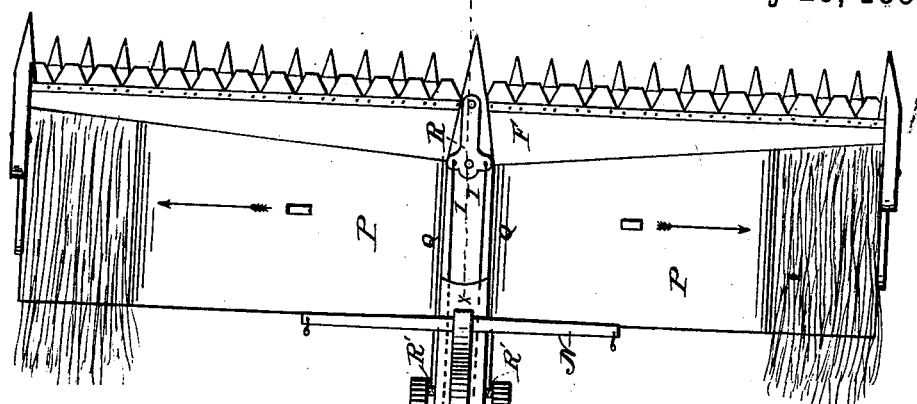
Figure 2:
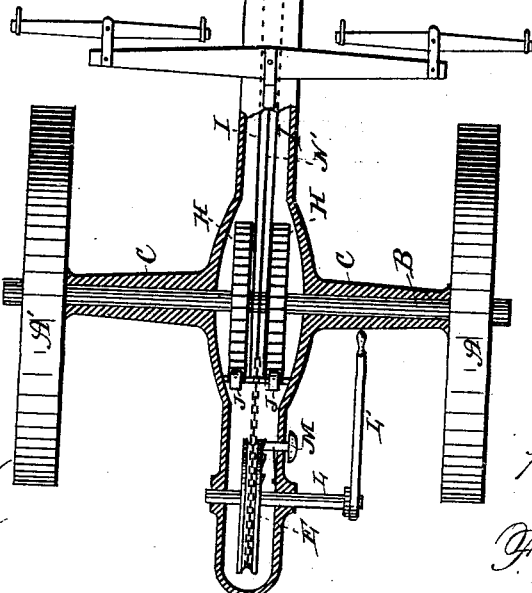

In the accompanying drawings, which fully illustrate my invention, Figure 1 is a side elevation of an apparatus embodying my invention, partly in section. Fig. 2 is top view of the same, partly in section. Fig. 3 is a rear elevation of one end of the finger-beam, carrier-apron, and sliding grain-dumping device. Fig. 4 is a top plan view of the apron-guard and dumping device. Fig. 5 is a section on the line *x x*, Fig. 2, showing end of apron and dumping device. Figs. 6 and 7 are detailed views, showing action of tripping-dog for actuating dumping device. Fig. 8 is an enlarged detailed view of one of the actuating-cams and its attachments.

A A' represent the driving-wheels rigidly secured to the axle B. This axle is journaled in suitable bearings, C, and has rigidly secured to it, near the center, the actuating cams or wheels H. These wheels are placed sufficiently far apart to admit of free motion for the connecting-rods between them, to be more fully described farther on. The bearings C are made of two pieces of cast metal bolted together, having side bearings for the axle, a rear projection for the reception of the elevating-cam E, and a front projection for the insertion of the rear end of the hollow beam or tongue D, forming thus the main frame of the machine. The cams H, mounted on the axle, are provided with angular teeth or projections, as shown at Fig. 8, and are so arranged in regard to each other that the outer angles of one register with the inner angles of the adjacent one.

Pivoted in the castings C, at their upper ends, are the levers J, provided with projections J' for engaging with the cams, and have pivoted to their lower ends the reciprocating connecting-rods I, which extend through the hollow tongue and impart motion, through the double bell-crank lever R, to the cutters operating upon the front edge of the transverse beam F, which is secured upon the front end of the tongue D, as shown at Figs. 1 and 2.

Near the front end of the tongue D, upon its under side, are mounted the small drive-wheels O, having beveled teeth O' formed upon their inner sides, for imparting motion, through the beveled pinions R', mounted upon the rollers Q, to the endless aprons P, which extend along the rear side of the cutter-beam F, and are thus caused to travel in opposite directions from the center of the beam to near its outer ends as the machine advances, as indicated by the arrows in Fig. 2. Rising from the tongue D, above the wheels O, is the brace or stanchion D', having a vertical slot in its front edge, in which is secured the neck-yoke N, to which the draft-animals are fastened.

To the under side of the yoke N, at the center, is fastened the chain or rope N', which passes under a small sheave at the bottom of the slot and extends back through the hollow tongue D to the cam E, mounted upon the shaft L, which has its bearings in the rear extension of the casting C. To the outer end of the shaft L is fixed the hand-lever L', which extends upward within reach of the driver in the seat X. By means of this mechanism the front end of the tongue can be raised from the ground when the machine is not in operation, as will be readily understood, the tongue being held in a raised position by means of the spring-dog M, passing through the casting C, which engages with ratchet-teeth formed on the adjacent side of the cam E, as shown.

The rearward extension of the casting, upon which the driver's seat is secured, serves as a counterbalance for the machinery at the front end of the tongue, and prevents the latter from bearing too heavily upon the animals' necks when the tongue is in a raised position.

It will be seen that as the cut grain falls upon the endless aprons P it will be conveyed by them to the outer ends of the cutter-beam, and, were no means provided for preventing it, would be strewed loosely in lines along the ground. In order to overcome this, and to cause the grain to be collected into gavels large enough for tying, and deposited on the ground at regular intervals, I have devised the mechanism illustrated in Figs. 3, 4, 5, 6, and 7.

T is a guard secured at a suitable distance below the endless apron, upon the outer end of which is the slide S, the slide being secured and allowed a lateral reciprocating movement by sliding bolts and slots T', made in the outer end of the guard.

U U represent coiled springs, which press against the inner edge of the slide, and serve normally to keep it pressed out beyond the outer end of the guard T, as shown at Fig. 4.

Pivoted in the inner end of the extension S' of the slide S is the tripping-dog V, which is L-shaped, one side bearing normally against the upper side of the apron-guard T, the other side projecting up directly in the path of the catch P', which is secured to the traveling apron P.

V' is an opening made in the guard T at a point to register with the pivoted dog V when the slide S is at the inner limit of its movement.

The operation of the grain-dumping device is as follows: The cut grain is deposited by the apron upon the slide S and there retained until the catch P' strikes against the upwardly-pivoting end of the tripping-dog V, when it causes the slide S to move in against the tension of the springs U, causing the gavel of grain on the slide to fall to the ground. Where the dog V reaches the opening V' made in the guard its trip releases its hold on the catch P', and the springs U instantly force the slide back to its former position to collect another gavel of grain, when the operation above described is repeated. As here shown, each apron is provided with two of the catches P' for operating the slides; but the number may be varied according to the length of aprons used and the size of gavels that it is desired to deposit on the ground.

A mowing-machine thus constructed is exceedingly light, simple, and effective, its operations are direct and easily controlled, while the work imposed upon the animals is very much less than is required by other machines. Moreover, by having the cutter-bars in front of the horses, out of the way of the driver, he runs no risk of being maimed or mutilated should he be thrown from his seat when the machine is in motion.

I do not care to limit myself to the precise construction herein shown and described, as it is evident that many modifications and variations of my devices may be employed without departing from the spirit of my invention.

Having thus described my invention, I claim—

1. A mowing-machine having the cutter-bar secured at its center to the front end of the tongue, the rear end of the tongue being secured in the center draft-frame, which has bearings for the driving-shaft B and a rearward extension for supporting the driver's seat, and the elevating mechanism, whereby the weight at the front end of the tongue is counterbalanced and too great strain on the horses' necks prevented, substantially as described.

2. In combination with the tongue having the cutter-bar and grain-collecting mechanism at its front end, the stanchion D', having a vertical slot in which is secured the neck-yoke, which is caused to travel in the slot by means of the rope or chain attached thereto, and extending back to the cam E at the rear of the draft-frame, the said cam being provided with a suitable lever for operating it and a ratchet and dog for retaining it in position, whereby the front end of the tongue can be raised from the ground, substantially as specified.

3. The drive-wheels A, shaft B, center draft-frame, C, cams H, secured to the shaft, levers J, pivoted in the frame C, and actuated by the cams H, connecting-rods I, and bell-crank lever K, for conveying the motion of the levers J to the cutter-bar, in combination with a cutter-bar of any suitable construction secured to the front end of the tongue, substantially as shown.

4. In combination with a cutter-bar secured to the front end of the tongue, mechanism for actuating it, and the endless aprons for conveying the grain to the outer ends of the cutting devices, the grain-receiver or slide S, sliding in slots or grooves in the apron, guard T, provided with springs for restoring it to its normal position, and a suitable tripping-dog, V, which catches against the catch P', secured to the apron, whereby the grain is collected in gavels and deposited at regular intervals on the ground, substantially as shown and described.

In testimony whereof I affix my signature in presence of two witnesses.

RICHARD TEMPERTON.

Witnesses:
JOHN PARRY,
JESSE TEMPERTON.